UNITED STATES PATENT OFFICE.

JAKOB SCHMID AND HUGO WEIL, OF BASLE, SWITZERLAND, ASSIGNORS TO SOCIETY OF CHEMICAL INDUSTRY IN BASLE, OF SAME PLACE.

BLUE-GREEN DYE.

SPECIFICATION forming part of Letters Patent No. 583,267, dated May 25, 1897.

Application filed December 4, 1896. Serial No. 614,401. (Specimens.)

*To all whom it may concern:*

Be it known that we, JAKOB SCHMID, a citizen of the Swiss Republic, and HUGO WEIL, a subject of the King of Bavaria, residing at Basle, Switzerland, have invented certain Improvements in the Manufacture of Coloring-Matters, of which the following is a full, clear, and exact description.

Our invention relates to the production of new coloring-matters for wool and silk from benzaldehydedisulfonic acids (CHO:SO$_3$H:SO$_3$H=1:2:4 and 1:2:5) and non-sulfonated benzylanilin derivatives.

In carrying out our invention we practically first produce leuco compounds of the general formula

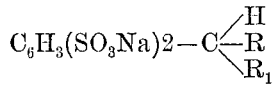

(wherein one of the radicals R and R$_1$ at least signifies the radical of a non-sulfonated benzylanilin derivative) by the condensation of one molecule of benzaldehyde disulfo-acid with two molecules of anilin derivatives, one of which at least is one of the following non-sulfonated benzylanilin derivatives: benzylethylanilin, benzylmethylanilin, dibenzylanilin, monobenzylorthotoluidin, or their products of substitution, which contain a methyl or nitro group or chlorin in the radical of benzyl and are obtained by the action of chlorid of benzyl and its homologues and their nitro or chloro derivatives of substitution on anilin, monoalkylanilin, and orthotoluidin. The leuco compounds thus obtained are subsequently treated with an oxidizing agent—as, for example, peroxid of lead, peroxid of manganese, chromic acid, &c.—and transformed by this means into the new dyestuffs, which are easily soluble in water, with a pure green-blue coloration, which does not change by the addition of dilute acids, and which dye animal fibers in brilliant, intense, and uniform blue-green to green-blue tints fast against the influence of acids and alkalies. These dyestuffs are precipitated from their solutions by the addition of common salt.

We will first describe the production of the benzaldehyde disulfo-acids employed in our invention and thereafter the production of the coloring-matters derived therefrom.

I. *Preparation of the Benzaldehyde Disulfo-Acids.*

(*a*) Production of the benzaldehyde disulfo-acid, (CHO:SO$_3$H:SO$_3$H—1:2:5.)—One part of orthochlorobenzaldehyde is introduced into five parts of fuming sulfuric acid of thirty per cent. while constantly agitating and taking care, by cooling, to prevent the temperature of the mixture from rising above 10° centigrade. After agitating for about two hours the mixture is slowly heated up to 80° to 85° centigrade and is kept at this temperature until a sample diluted with water has no odor of chlorobenzaldehyde when it is heated. The product of the reaction is then poured into ice-water and neutralized in the usual way by lime. When the calcium sulfate thus formed is separated from the solution, the latter is evaporated till a metallic pellicle forms on the surface. By cooling, the calcium salt of orthochlorobenzaldehyde metasulfonic acid then separates in the form of yellow scales, which are separated by filtration, pressed, and dried. For the transformation of the orthochlorobenzaldehyde metasulfonic acid thus obtained into benzaldehyde disulfonic acid (CHO:SO$_3$H:SO$_3$H=1:2:5) two hundred liters of a ten-per-cent. solution of sodium bisulfite are neutralized by soda-lye and then heated with two hundred kilos of the calcium salt of orthochlorobenzaldehyde metasulfonic acid (obtained as described) in a closed vessel for eight to ten hours up to about 180° to 200° centigrade. After cooling, the vessel is opened, and to the solution are added fifteen kilos of concentrated sulfuric acid and the excess of sulfurous acid then driven off by boiling. After separation of the calcium sulfate the solution which contains benzaldehyde disulfonic acid is ready to be employed for producing coloring-matters.

(*b*) Production of the benzaldehyde disulfo-acid (CHO:SO$_3$H:SO$_3$H=1:2:4).—One hundred parts of dichlorobenzaldehyde (CHO:Cl:Cl=1:2:4) are mixed with six hundred parts of a ten-per-cent. solution of sodium bisulfite, and to this are added one hundred parts of thirty-per-cent. soda-lye and two hundred and forty parts of water. The whole is heated in a closed vessel for six to eight hours under a pressure of eight to nine atmospheres. After cooling the contents of the vessel the mixture is acidulated with one hundred and forty parts of concentrated sulfuric acid. In order to eliminate an excess of sulfurous acid, as well as the traces of bichlorobenzaldehyde not attacked, the product is heated for some time. The remaining solution contains benzaldehyde disulfonic acid, (CHO:$SO_3$H:$SO_3$H = 1:2:4,) as by boiling it with sulfite solutions the orthoparadichlorobenzaldehyde exchanges not only its atom of chlorin, which is in the "ortho" position, but also that in the "para" position for a sulfo group. The solution thus obtained may be used directly for the preparation of the coloring-matters.

II. *Preparation of the New Coloring-Matters.*

Example 1. Coloring-matter derived from one molecule of benzaldehydedisulfonic acid (CHO:$SO_3$H:$SO_3$H=1:2:5) and two molecules of methylbenzylanilin: One hundred and forty parts of a ten-per-cent. solution of benzaldehydedisulfonic acid (CHO:$SO_3$H:$SO_3$H=1:2:5) are condensed with nineteen parts of methylbenzylanilin at the temperature of the water-bath. The resinous and greenish condensation product is boiled with dilute hydrochloric acid, in order to separate the small quantities of methylbenzylanilin not attacked, and is then dried. Ten parts of the disulfonic-leuco compound thus obtained are dissolved in one thousand parts of water, care being taken to add the desired quantity of sodium carbonate. The solution obtained is acidulated with sulfuric acid and oxidized by the desired quantity of lead peroxid—as, for instance, fifteen parts of a fifty-per-cent. peroxid of lead. When the oxidation is completed, the product is neutralized with chalk and the solution of the coloring-matter, cleared from lead and calcium sulfates, is evaporated to dryness. It is a powder with coppery luster readily soluble in water. In an acid-bath it dyes wool an intense greenish blue. When in this example benzylorthotoluidin, ethylbenzylanilin, dibenzylanilin, nitrobenzylanilin, nitrobenzylmethylanilin, nitrobenzylethylanilin, chlorobenzylethylanilin, chlorobenzylmethylanilin, nitrobenzylorthotoluidin, chlorobenzylorthotoluidin, &c., are substituted for the methylbenzylanilin, coloring-matters are obtained having more bluish shades.

Example 2. Coloring-matter derived from one molecule of benzaldehydedisulfonic acid (CHO:$SO_3$H:$SO_3$H=1:2:4) and two molecules of ethylbenzylanilin. One hundred and fifty parts of a ten-per-cent. solution of benzaldehydedisulfonic acid (CHO:$SO_3$H:$SO_3$H=1:2:4) are heated on the water-bath with twenty-one parts of ethylbenzylanilin for about ten hours. After cooling the aqueous solution is decanted from the resinous product of condensation, which is deposited at the bottom of the vessel. This condensation product is then dissolved in a dilute solution of sodium carbonate, and from this solution the disulfonic acid is precipitated afresh by the addition of sulfuric acid, after which it is separated by filtration and dried. Ten parts of the dry disulfonic leuco compound are dissolved in two hundred and fifty parts of water containing the requisite quantity of sodium carbonate. The solution is then acidulated with acetic acid and has introduced into it eight parts of forty-per-cent. peroxid of lead paste, care being taken to constantly stir the mass while adding the peroxid of lead. After completion of the oxidation the lead is precipitated by an addition of Glauber salts, and the coloring-matter is precipitated from the filtered liquid by an addition of common salt. It consists of a powder with a coppery luster, which dissolves in water with blue color. It dies wool in an acid bath a greenish-blue color. In this example ethylbenzylanilin may also be replaced by equivalent quantities of methylbenzylanilin, dibenzylanilin, or benzylorthotoluidin, or the nitrobenzyl, chlorobenzyl, or methylbenzyl derivatives of anilin and orthotoluidin.

With a similar result mixed coloring-matters are prepared, if in the foregoing examples for the condensation of two molecules of the benzylated aromatic amido compounds with one molecule of benzaldehyde disulfonic acid, the half—that is to say, one molecule of the benzylated amin—is replaced by one molecule of the following compounds: dimethylanilin, diethylanilin, monomethylorthotoluidin, monoethylorthotoluidin, sulfobenzylanilin, sulfobenzylethylanilin, sulfobenzylmethylanilin, sulfodibenzylanilin, or sulfobenzylorthotoluidin.

Having thus described our invention, we claim—

1. The herein-described process for the production of coloring-matters from benzaldehyde disulfo-acids (COH:$SO_3$H:$SO_3$H=1:2:5 and 1:2:4) and non-sulfonated benzylanilin derivatives by first forming the leuco compounds of the general formula:

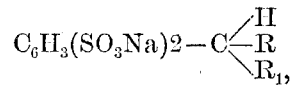

wherein one of the radicals R and $R_1$, at least, is the radical of a non-sulfonated benzylanilin derivative, and by subsequently treating these leuco compounds by means of oxidizing agents, as for instance peroxids or chromic acid.

2. As a new article of manufacture, the herein-described coloring-matter derived from a benzaldehyde disulfonic acid and non-sulfonated benzylanilin derivatives, which dyes animal fiber in an acid bath a blue-green to green-blue tint, fast against alkalies and dilute acids, which is, when in dry state, a brown powder with a coppery luster, readily soluble in water with a pure green-blue coloration, which does not change by the addition thereto of dilute acids, and which is precipitated from its solutions by the addition of common salt.

In witness whereof we have hereunto signed our names in the presence of two subscribing witnesses.

JAKOB SCHMID.
HUGO WEIL.

Witnesses:
GEORGE GIFFORD,
AMAND RITTER.